March 4, 1930. E. A. SPERRY Re. 17,614

BEACON SYSTEM FOR NIGHT FLYING

Original Filed April 26, 1922 3 Sheets-Sheet 1

INVENTOR
ELMER A. SPERRY.
BY
Herbert H. Thompson
his ATTORNEY.

March 4, 1930. E. A. SPERRY Re. 17,614

BEACON SYSTEM FOR NIGHT FLYING

Original Filed April 26, 1922 3 Sheets-Sheet 2

INVENTOR
ELMER A. SPERRY.
BY
Herbert H. Thompson
his ATTORNEY.

March 4, 1930. E. A. SPERRY Re. 17,614
BEACON SYSTEM FOR NIGHT FLYING
Original Filed April 26, 1922 3 Sheets-Sheet 3
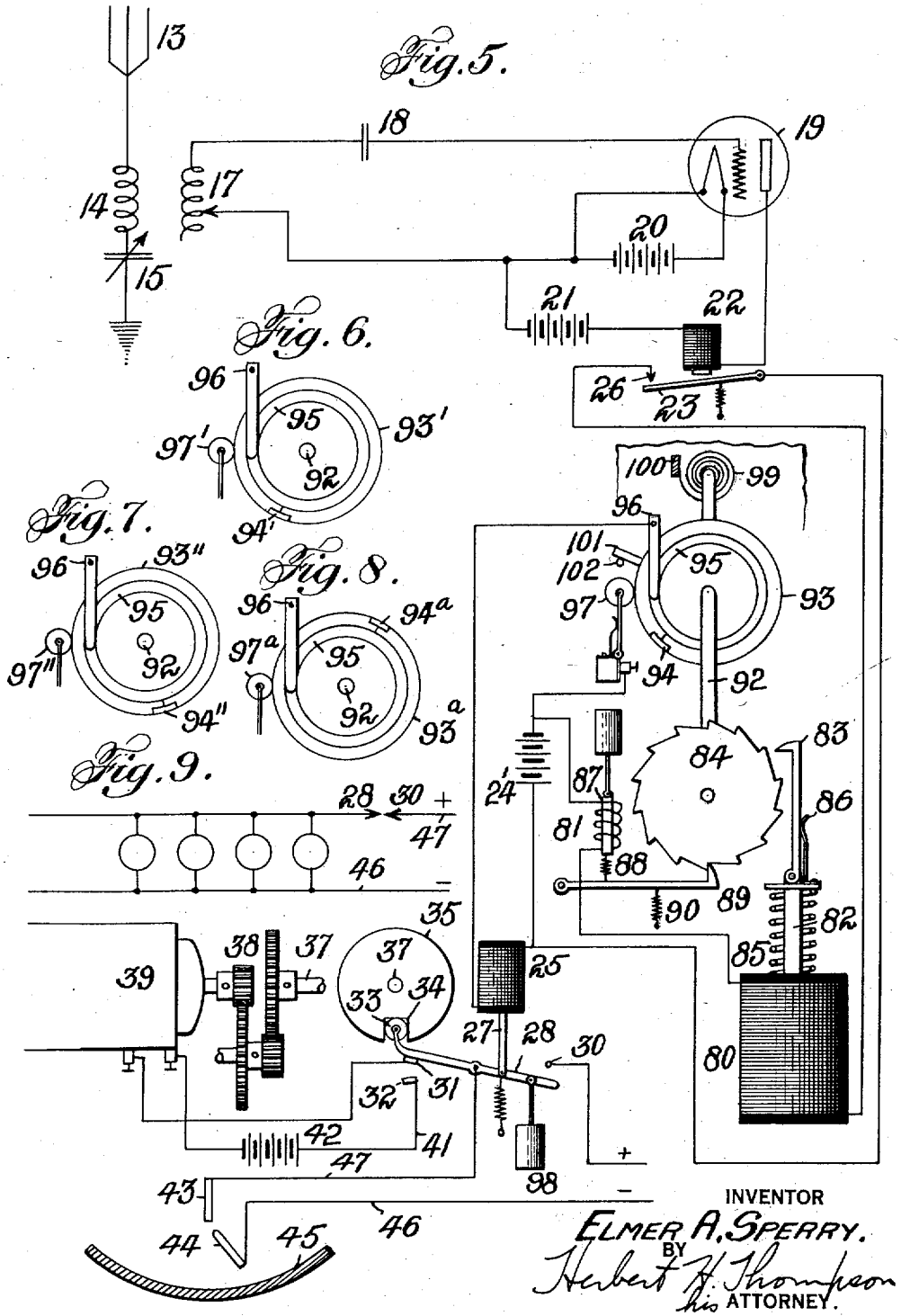
INVENTOR
ELMER A. SPERRY.
BY
Herbert H. Thompson
his ATTORNEY.

Reissued Mar. 4, 1930

Re. 17,614

UNITED STATES PATENT OFFICE

ELMER A. SPERRY, OF BROOKLYN, NEW YORK, ASSIGNOR TO SPERRY DEVELOPMENT COMPANY, OF DOVER, DELAWARE, A CORPORATION OF DELAWARE

BEACON SYSTEM FOR NIGHT FLYING

Original application filed April 26, 1922, Serial No. 556,783. Renewed November 11, 1927. Original No. 1,709,377, dated April 16, 1929. Application for reissue filed June 18, 1929. Serial No. 371,862.

This invention relates to a signaling system for guiding aircraft when flying at night or in thick weather when the usual landmarks are invisible. Said signals may be of a type by which the aviator may tell his position with reference to any predetermined objective.

The object of the invention is to provide a system and means whereby an aviator traveling between distant points, may either automatically or at will successively bring into operation, a series of signals, lights or other beacons stationed at intervals along the course of travel, or whereby he may selectively bring into operation the lights of any of several beacon stations or aviation fields over which he has control. For this purpose the landing fields are equipped with any form of receiving apparatus which is adapted to be brought into operation from a disturbance-producing or wave impulse-producing means on the aircraft. As illustrating one form my invention may assume, I have shown a radio sending and receiving system, but it will be understood that other systems of producing and receiving impulses may be employed within the scope of the appended claims.

Referring to the drawings wherein I have shown what I now consider to be the preferred form of my invention:

Fig. 5 is a diagrammatic view of a beacon and the receiving and controlling apparatus therefor, adapted in turn to be controlled by the apparatus shown in Figs. 3 and 4.

Figs. 6, 7 and 8 are details of a part of the selector system located at separate stations.

Fig. 9 shows several landing field lights controlled by my device.

Figure 1:
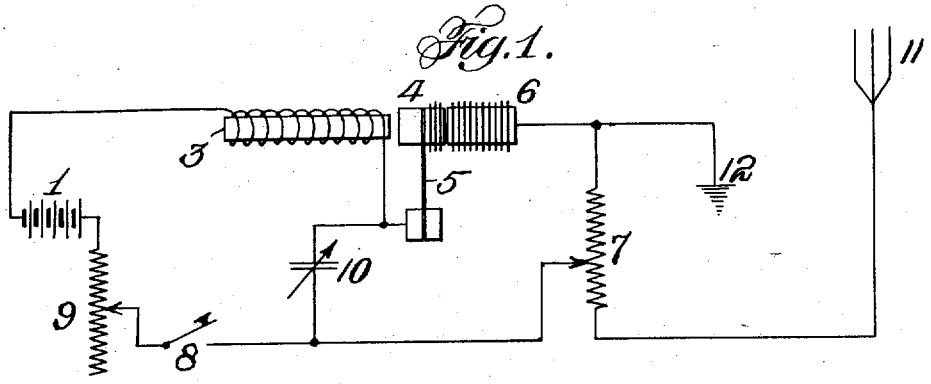
Fig. 1 is a wiring diagram of a radio transmitting set adapted to be carried by the aircraft for controlling the beacons.

In Fig. 1 I have shown a radio transmitting apparatus such as disclosed in United States Patent No. 1,382,177. This apparatus comprises a source of E. M. F. 1, an inductance magnet coil 2, having a core 3; an oscillating electrode 4 carried by a spring 5; a fixed electrode 6; an inductance 7; operating key 8; resistance 9; a condenser 10; an antenna 11 and a ground connection at 12. When the key 8 is closed, the core 3 causes electrode 4 to vibrate, making and breaking contact with electrode 6, causing a high potential discharge between the electrodes which is greatly aided by the condenser 10.

Figure 2:
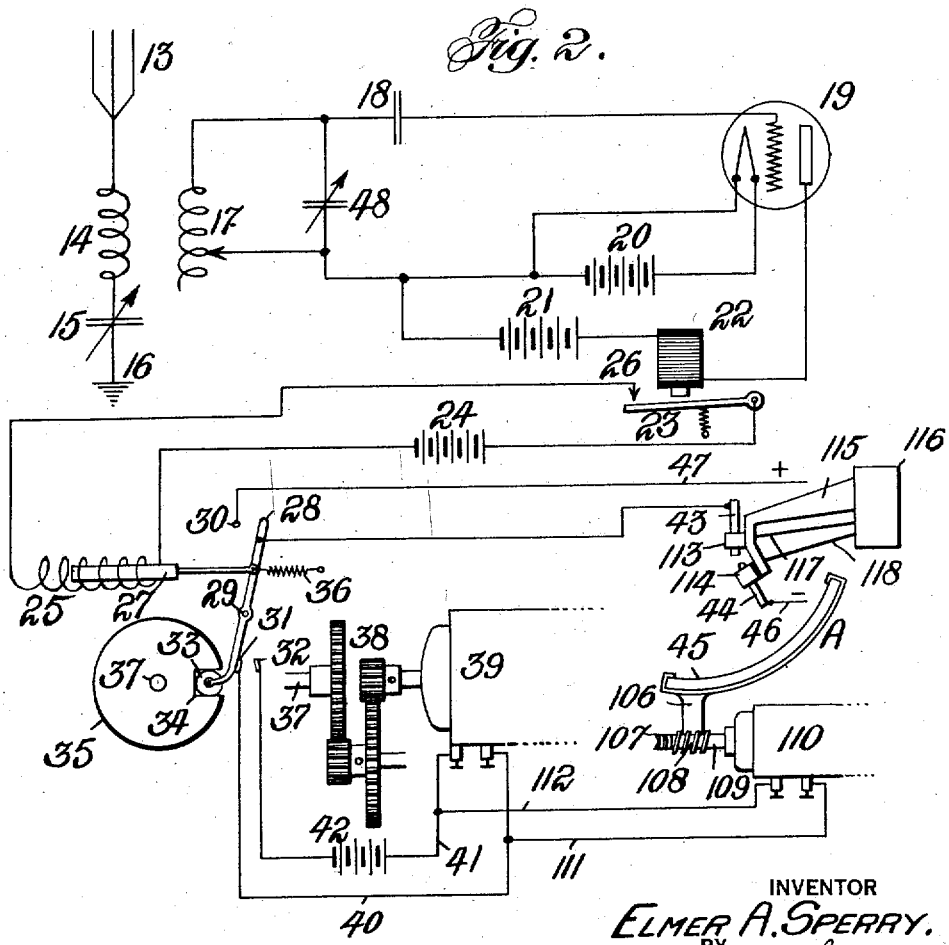
Fig. 2 is a diagrammatic representation of a beacon and the radio receiving and controlling apparatus therefor.

In Fig. 2 I have shown a simple receiving apparatus, comprising an antenna 13 connected through a primary winding 14 and a condenser 15 to the ground 16; a secondary 17 connected with a condenser 18, and an audion 19. A source of energy for heating the filament of the audion is shown at 20. A second source of energy 21 is shown connected with the audion and with a relay 22. It will be understood that an impulse emanating from the sending antenna 11 and received by the antenna 13 will through the action of the audion and the battery 21 cause energization of the relay 22.

The armature 23 of the relay is shown as adapted to close a circuit through a battery 24 or other suitable source of electrical energy and a solenoid 25 by engaging contact 26. The armature 27 of solenoid 25 may be connected to a lever 28 pivoted at 29 and adapted to engage a contact 30 at one end. The other end of said lever may carry a contact 31 adapted to engage a fixed contact 32. Said other end of lever 28 is shown as carrying a roller 33 adapted to fit into a notch 34 in a wheel 35. A spring 36 may be provided to press the roller into said notch 34. Wheel 35 is carried on a shaft 37 of reduction gearing 38 which is in turn actuated by a motor 39. Said motor is shown as connected by wires 40, 41 through a battery 42 to contacts 31, 32.

As the signaling means I have illustrated a searchlight or beacon adapted to project a vertical beam although it will be understood that other forms of radiant signals, visible or otherwise, may be employed, if desired. The beacon itself is shown at A in diagrammatic form only, as the specific form of signal employed forms no part of this invention. For a more complete disclosure of this type of beacon, reference is had to my patent for an aviation beacon No. 1,548,958, issued August 11, 1925. It will be understood that the usual automatic arc lamp wherein the closing of a circuit will cause the lamp to light and remain lighted while the circuit is so closed may be employed such as shown in my U. S. Patent No. 1,362,575. The positive and negative electrodes of such a lamp are shown at 43, 44 in connection with a projector 45 which may be so positioned as to project a beam of light upwardly into the sky. The electrodes are supported by holders 113, 114 mounted on an arm 115 secured to the control box 116 which contains mechanism for automatically controlling the electrodes through rods 117, 118. The supply lines are shown at 46, 47, the line 47 having interposed therein a switch comprising the aforementioned lever arm 28 and contact 30.

Each beacon station may be provided with the apparatus shown in Fig. 2. This apparatus may be adapted to respond, by closing contacts 23, 26, to impulses of a predetermined wave length and amplitude. These adjustments may be effected by any of the well known methods; as for instance, by means of the variable condensers 15, 48 and by varying the amount of secondary 17, included in the circuit. These adjustments having been effected may thereafter be maintained. The sending apparatus on the other hand, may if desired, be so adjusted as to be slightly detuned to the receiver, but provided with sufficient amplitude to cause the receiver to respond under normal weather conditions when within a predetermined radius. When adverse weather conditions prevail so that the impulses produced by the transmitter do not reach the receiver with sufficient amplitude to cause the latter to respond, the aviator having cognizance of the weather conditions, may compensate for the same by increasing the amplitude of the transmitter and at the same time tuning a little closer to the receiver. This compensating adjustment may be effected by reducing the amount of resistance 9 included in the sending circuit.

With the apparatus thus described, it will be seen that where aviation beacons are stationed at intervals along the course of travel, an aviator may from time to time bring into operation a beacon located at a predetermined distance ahead of him. This may be done by closing key 8 when approaching the beacon. Or the key may be kept closed as the aviator flies, the beacon being lighted as soon as the transmitter comes within reach of the receiver. Where the system employed is to keep the sending key 8 locked, the timing disc 35 may be omitted. The switch 28—30 will then be held closed by the continued action of solenoid 25 until the aircraft passes beyond the point where the impulses transmitted are able to control the receiver, whereupon the light will cease to burn.

Another method by which the aviator may control the lighting of the several beacons may be by tuning each receiver such as shown in Fig. 2 to a different wave length. An aviator may be provided with a chart showing the positions of the several beacons and their wave lengths. When he desires to light a certain beacon, he will adjust his apparatus to produce oscillations of the wave length of that beacon and then press the sending key 8. The apparatus in Fig. 2 located at that beacon will respond.

Obviously the apparatus should be tuned to wave lengths which are not commonly used in radio transmission, so that the beacons will not be lighted by interfering sources.

In order that the stations may be comparatively immune from interference, a system may be employed wherein the receivers will not only be tuned to operate at a particular wave length but will only operate in response to that wave length when a predetermined code or combination of impulses or an impulse of a given duration is received. Each station may have its separate code and the transmitter may be adapted to automatically transmit the code of any station in response to the actuation of a selector switch. While the system and the codes may be made very complex, I have shown in Figs. 3 to 8 inclusive, a simple form of selector system which will serve to illustrate my invention.

Figure 4:
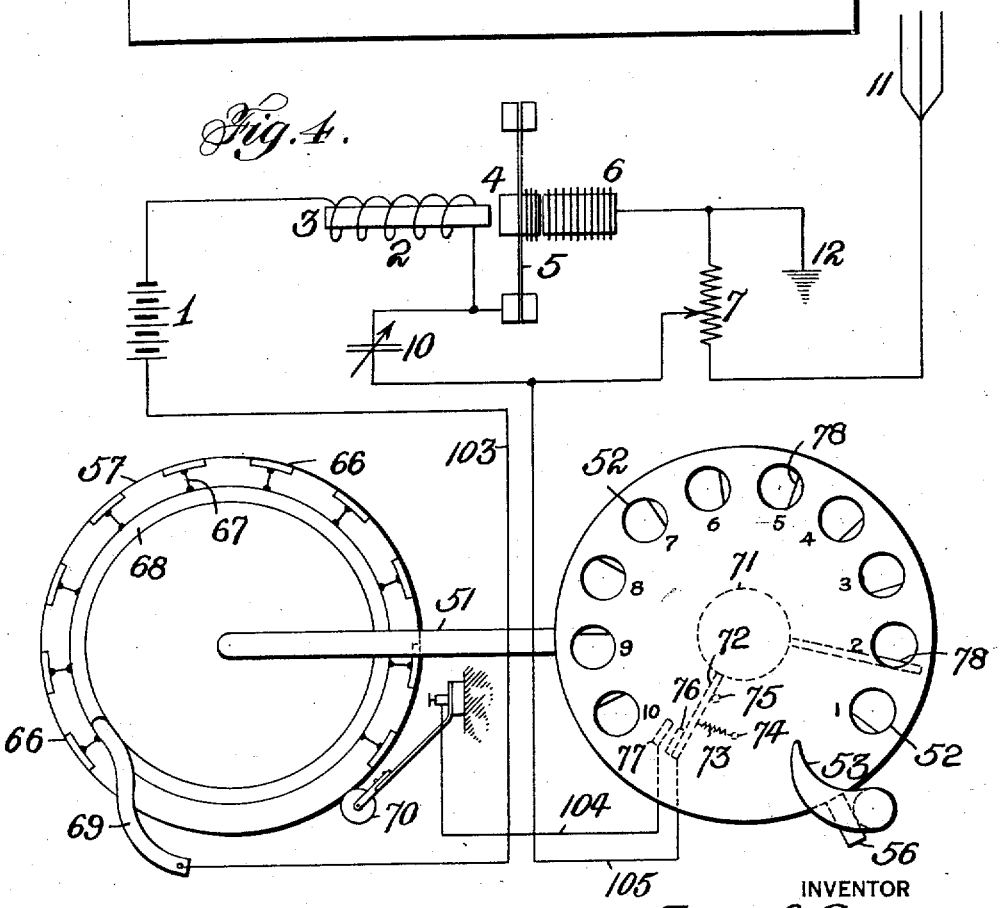
Fig. 4 is a diagrammatic view of part of the apparatus contained in the casing shown in Fig. 3.

In this form the same type of sending apparatus as disclosed in Fig. 1 is used for illustration in Fig. 4. The resistance 9, however, is not shown. The corresponding elements in the two instances are designated by the same reference characters. Instead of the key 8 the circuit is opened and closed in a manner which will presently be brought out.

Figure 3:
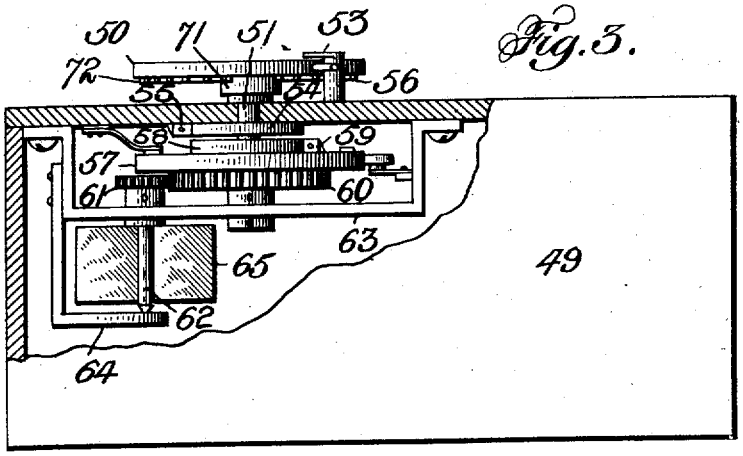
Fig. 3 is a transmitter casing partly in section of a modified form of the invention.

The transmitting apparatus may be contained in a casing 49 (Fig. 3). Without said casing is a dial 50 fixedly mounted on a shaft 51 reaching into the casing. The dial may be provided with a plurality of holes 52 near its periphery. Fixed on the top of the casing and reaching over the top of the dial is a stop bracket 53. Within the casing the shaft 51 carries a spring 54 which is secured to the casing at 55 and serves to resiliently hold the dial in its normal position with the projection 56 on the dial pressing against the stop 53. Loosely mounted on shaft 51 within the case may be provided a disc 57. A spring 58 carried by shaft 51 and secured to said disc at 59 may serve to cause the disc to follow the rotational movements of the shaft 51 and dial 50. Integral with disc 57 is a gear 60, meshing with a pinion 61, on a shaft 62 which bears in frame 63 and bracket 64. The shaft 62 may carry fan blades 65 adapted to act as a governor to limit the speed of the disc 57.

Disc 57 may carry contact inserts 66 corresponding to the several holes 52 in the dial 50. Each of these inserts may be electrically connected as at 67 to a collector ring 68. A brush 69 may constantly engage ring 68, while a trolley 70 may serve to ride over the periphery of the disc to successively engage the inserts 66 as the disc rotates.

Loosely mounted on shaft 51 directly under the dial 50 is shown a hub member 71 provided with an arm 72 which may normally be held by a spring 73 secured at one end to the arm and at the other to a pin 74 in the dial, against a pin 75 carried by the dial. Said arm may carry a contact 76 adapted to engage a cooperating contact 77 carried by the dial. In the normal position, the contacts are separated as shown. Additional arms 78 may be provided on hub 71, reaching across the holes 52 as shown.

The receiving apparatus is shown in Fig. 5 and may be the same as that shown in Fig. 2. The corresponding elements in the two figures are given the same reference numerals. The elements of the beacon light and the switch controlling device therefor in so far as they are identical with those shown in Fig. 2, also bear the same reference numerals as in Fig. 2. Interposed between the radio receiver and the beacon switch-controlling device, however, I have shown means for causing the switch-controlling device to be operated only when the proper signal for the particular station has been received.

In the circuit which is closed by contacts 23, 26 are shown two solenoids 80, 81. The armature 82 of solenoid 80 carries a pawl 83 adapted to act upon a ratchet wheel 84. A spring 85 holds the pawl in the position shown, out of contact with ratchet 84, so that the latter may turn backward without interference from the pawl. The pawl is, however, resiliently pressed as by spring 86 into position to engage and actuate the ratchet. The armature 87 of solenoid 81 may be connected through a spring 88 to a pawl 89 adapted to lock ratchet 84 in position. A spring 90 is adapted to hold said pawl out of contact with the ratchet when the solenoid is not energized. This spring is of course weaker than spring 88 and is overcome by the latter when the armature 87 is in its inner position as shown. The armature 87 may be connected to a dash pot 91 adapted to hold pawl 89 in an operative position for a short time after the solenoid 81 has become deenergized.

On the shaft 92 with ratchet 84 is shown a disc 93 provided with a contact insert 94 electrically connected to a collector ring 95. A brush 96 engages said ring and a trolley 97 rides over the periphery of the disc and is adapted to engage contact 94 to close a circuit through the source 24′ and the solenoid 25. With the exception of a dash pot 98 connected to the switch arm 28, the switch-controlling apparatus may be the same as in Fig. 2. The function of the dash pot is to delay the action of solenoid 25 so that the switch 28—30 will not be closed in response to short periods of energization of the solennoid. Shaft 92 may be provided with a spring 99 connected at one end to a relatively fixed member 100 to normally hold the parts in off position with the projection 101 on disc 93 resting against a relatively fixed stop 102, and to return the parts to such position when the ratchet 84 is released by pawls 83, 89.

The position of contact 94 is such that it will engage trolley 97 after pawl 83 has twice engaged ratchet 84 and turned the same two notches. When this takes place, the solenoid 25 will become energized, but will not close switch 28—30, unless the parts are maintained in this position long enough to overcome the action of the dash pot 98.

Fig. 6 shows a disc 93′ having its contact 94′ so positioned that it will reach the trolley 97′ after the ratchet 84 has been turned three notches, while Fig. 7 shows the contact 94″ as adapted to reach the trolley 97″ when the ratchet has been turned four notches. The discs 93, 93′, 93″ may be employed at different stations. Thus, any desired number of discs having their inserts differently positioned may be employed for controlling an equal number of stations.

The operation is as follows:

The aviator desiring to light the beacon at a station which may be designated station "2" inserts his finger in the hole in dial 50 which is also designated "2" and turns the dial until his finger reaches the stop 53. He then holds the dial in this position for a short time representing the length of time that it takes to overcome the action of the dash pot 98.

The pressure of the finger will first rotate hub 71 and close contacts 76, 77. The rotation of dial 50 and shaft 51 will, through the connection of spring 59, cause disc 57 to follow, bringing the first and then the second of contacts 66 into engagement with the trolley 70. The closing of contacts 76, 77 and 66, 70 will close the sending circuit from battery 1 through conductor 103, brush 69, ring 68, contact 66, trolley 70, conductor 104, contacts 77, 76, conductor 105 and back through the elements of the transmitter as heretofore pointed out. After holding the dial for a short time it may be released, whereupon contacts 76, 77 will open and the dial 50 and disc 57 will be returned by spring 54 to their normal positions. The lost motion connection between the shaft 51 and disc 57 through spring 58 and the governor 65 will result in a somewhat uniform rotation of the contact disc 57 at a predetermined speed. Each time the circuit is closed an impulse will be transmitted and will be received by the apparatus at the several stations. The disc 93 will be stepped around until contact 94 engages trolley 97. The parts being held in this position long enough to overcome the dash pot 98, will cause switch 28—30 to be closed and also contacts 31, 32. Thus the beacon will be lighted and wheel 35 will be set in motion so that switch 28—30 can not again open until said wheel has completed a full revolution.

During the interval between the impulses received, the solenoids 80, 81 will become deenergized. Pawl 83 will then return to the off position as shown, but the dash pot 91 will prevent the immediate return of pawl 89, so that the latter will remain in engagement with ratchet 84 holding it in the position to which it was moved until the next impulse causes pawl 83 to again grip the ratchet to turn it another notch. When the dial 50 has been held long enough to cause the switch 28—30 to be closed, and is then released, solenoids 80, 81 again become deenergized. Pawl 83 will return to off position and spring 90 will gradually overcome the action of dash pot 91 and disengage pawl 89 from ratchet 84, whereupon the spring 99 will return the parts to their normal positions. It will be seen that pawl 83 in off position is out of the path of the teeth of the ratchet 84.

It will now be seen that the beacon station having the disc 93 (Fig. 5) is responsive to a code signal represented by one short and one long impulse, or in other words, a dot and a dash, and that the proper impulses may be produced by inserting the finger in the hole in dial 50 designated "2". The code to which a station employing the disc in Fig. 6 on the other hand would be two dots and a dash and that of a station employing the disc in Fig. 7 would be three dots and a dash.

When the dial 50 is released and returns to its normal position the spring 73 will separate contacts 76, 77, so that as the contacts 66 on disc 57 successively engage trolley 70 while returning, the transmitting circuit will not be closed and no unnecessary operation of the transmitter or any of the receiving apparatus will take place.

As the aviator nears the aviation field at which he is to land, it is desirable that he shall be able to bring into operation the lights of the field adapted to serve as a guide in landing. The arrangement of these landing lights upon the field forms no part of the present invention and therefore will not be shown here; my object being simply to provide means whereby these lights may be lighted from an aeroplane. For this purpose, each landing field may be provided with one of the receiving and control devices shown in Fig. 5. The field flood lights may be connected to the supply lines 46, 47 as shown in Fig. 9. The closing of switch 28—30 will serve to close the circuit of the lights in the same manner in which it closes the circuits of the several beacons. In Fig. 8 I have shown a contact disc 93ª having an insert 94ª so positioned as to require ten strokes of the pawl 83 to bring it into contact with trolley 97ª. To effect this, the aviator will insert his finger in the hole marked "10" on the dial 50 and turn to stop 53, holding it in this position to overcome the dash pot 98. The code for the landing field lights then, is nine dots and a dash.

Each landing field may have its own code, or if the fields are widely separated so that impulses transmitted near one field will not affect the instruments at the others, all may be controlled by the same code. Thus, should the aviator be forced to make a landing on account of engine or other trouble, he can transmit the landing or position "10" code and thereby light up the nearest landing field. When separate codes are assigned to each field, the aviator will transmit the code of the nearest field when forced to land.

In order that an aviator may ascertain or verify his position from time to time, the signals may have distinctive characteristics by which they may be recognized. To this end, the reflector 45 in Fig. 2 is shown as tilted to one side and mounted on a vertical shaft 106 provided with a worm wheel 107 meshing with a worm 108 on the shaft 109 of a motor 110. The motor will thus serve to rotate the reflector about a vertical axis and cause the light beam to described a circle in the sky. The beam will appear from a distance to be tilting from side to side. Beacons of this characteristic are more specifically set forth in my aforesaid copending application for aviation beacons. The several beacons may have different periods of rotation, so that as observed the beams will oscillate at different speeds. Also, some of the beams may oscillate through wider angles. Motor 110 may be connected through conductors 111, 112 through source 42 to contacts 31, 32 so as to be brought into action whenever the beacon is lighted.

In accordance with the provisions of the patent statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having herein described my invention what I claim and desire to secure by Letters Patent is:

1. In a beacon system for aircraft, the combination with an aircraft, of a wave impulse sending instrument on the aircraft, a beacon and a receiver for controlling said beacon and adapted to be placed in operation by said sending instrument.

2. In a directing system for aircraft, the combination with an aircraft, of an instrument for sending suitable wave impulses on the aircraft, a plurality of signals adapted to be placed along the course of the craft and suitable impulse receivers for the signals adapted to set the signals into operation upon approach of the aircraft.

3. In a beacon system for aircraft, the combination with the aircraft, of a radio sending instrument mounted thereon and adapted to transmit signals of variable characteristics, a plurality of beacons, a radio receiver for each beacon set to respond to signals of predetermined characteristics, and means controlled by said receivers for effecting the operation of its beacon.

4. The method of assisting aviators when flying at night which consists in providing at a landing field along the course flood lamps for illuminating the field and setting said lamps into operation by the transmission of a suitable impulse signal from the aircraft.

5. The method of assisting aviators when flying at night which consists in providing at a landing field along the course, a beacon and a flood lamp, setting said beacon automatically into operation on approach of the aircraft and setting said flood lamp into operation at the will of the aviator.

6. In combination, an aircraft, a radio transmitter adapted to be carried by said aircraft, a radio receiver adapted to respond to impulses produced by said transmitter, a signal for directing the craft, and means controlled by said receiver to cause said signal to become operative.

7. In combination, a plurality of beacons, impulse receiving apparatus for controlling each beacon, an impulse transmitter adapted to be carried by an aircraft and adapted to produce a continuous oscillation of predetermined characteristics for controlling each receiving apparatus when within predetermined distance thereof.

8. In combination, a receiver adapted to respond to impulses of predetermined characteristics, a switch, means controlled by said receiver for causing said switch to be closed during the period that said receiver is responding to said impulses, means for opening said switch when not acted upon by said first mentioned means and for holding the same normally opened, and a navigation aid controlled by said switch.

9. In combination, a disturbance detecting means, a beacon, means for causing oscillation of the beam produced by said beacon, and means controlled by said first-named means for starting said beacon and for rendering said oscillation producing means operative.

10. In combination, a wave impulse receiver, a beacon, means controlled by said receiver for lighting said beacon, timing means for controlling the length of time said beacon is lighted, and means also controlled by said receiver for rendering said timing means operative.

11. In combination, an aircraft, a plurality of signals of distinguishable characteristics, radio receiving apparatus for controlling each signal, a radio transmitter adapted to be carried by said aircraft and adapted to produce a continuous oscillation of predetermined characteristics for controlling each receiving apparatus when within predetermined distance thereof.

12. The method of assisting aviators when flying at night which consists in providing at a landing field along the course flood lamps for illuminating the field and setting said lamps into operation by the transmission of wave impulses sent out by the aircraft.

13. The method of assisting aviators when flying under conditions of low, or absence of, visibility, which consists in providing means located upon the plane for setting automatically into operation, on approach of the plane, and at the will of the aviator, useful means for facilitating landing or continued flight.

14. In an automatic lighting system for landing fields, the combination with wave impulse-producing means on the aircraft, of flood lights, a receiving instrument at the port responsive to reception of impulses from the aircraft of predetermined characteristics, and means controlled thereby for lighting said lights.

15. In an automatic lighting system for landing fields, the combination with wave impulse-producing means on the aircraft, of flood lights, a receiving instrument at the port responsive to reception of impulses from the aircraft of predetermined characteristics, and means controlled thereby for lighting said lights on the received impulses becoming of predetermined magnitude and extinguishing the same on decrease in such magnitude.

16. In an automatic lighting system for landing fields, the combination with a lighting system for each field and a means on the aircraft producing a continuous disturbance of a receiving instrument at each field attuned to such disturbance and adapted to be brought into operation when said means is within a predetermined distance thereof, and means controlled by said instrument for lighting said system.

17. In a beacon system for aviators, the combination with air beacons and means on the aircraft producing a continuous disturbance, of a receiving instrument at each beacon attuned to such disturbance and brought into action on increase in volume of the received disturbance beyond a predetermined magnitude, and means controlled by said instrument for rendering said beacon effective.

18. In a beacon system for aviators, the combination with air beacons and means on the aircraft producing a continuous disturbance, of a receiving instrument at each beacon attuned to such disturbance and brought into action on increase in volume of the received disturbance beyond a predetermined magnitude, and means controlled by said instrument for rendering said beacon effective for quenching said beacon on decrease in such magnitude.

19. In a system for assisting aerial navigation, normally inoperative signalling means located at predetermined points, such as landing field, for facilitating landing or continued flight, means on the aircraft producing a disturbance, and a receiving device at said predetermined points responsive to said disturbance for rendering said signalling means operative.

20. In combination, an aircraft, a transmitter for sending suitable wave impulses adapted to be carried by said aircraft, a suitable impulse receiver adapted to respond to impulses produced by said transmitter, a navigation aid for the craft, and means controlled by said receiver to cause said aid to become operative.

In testimony whereof I have affixed my signature.

ELMER A. SPERRY.